US006714395B2

(12) United States Patent
Meisinger, Sr. et al.

(10) Patent No.: US 6,714,395 B2
(45) Date of Patent: Mar. 30, 2004

(54) METHOD FOR DETECTING FAULTS INTERNAL TO A DISTRIBUTION EQUIPMENT CONFIGURATION

(75) Inventors: Michael J. Meisinger, Sr., Chicago, IL (US); James K. Niemira, Skokie, IL (US)

(73) Assignee: S&C Electric Co., Chicago, IL (US)

( * ) Notice: Subject to any disclaimer, the term of this patent is extended or adjusted under 35 U.S.C. 154(b) by 348 days.

(21) Appl. No.: 09/888,263

(22) Filed: Jun. 22, 2001

(65) Prior Publication Data

US 2002/0015271 A1 Feb. 7, 2002

Related U.S. Application Data

(60) Provisional application No. 60/215,641, filed on Jun. 30, 2000.

(51) Int. Cl.[7] .................................................. H02H 3/00
(52) U.S. Cl. ........................................... 361/62; 361/64
(58) Field of Search ............................... 361/62, 63, 64, 361/65, 78

(56) References Cited

U.S. PATENT DOCUMENTS

| 5,132,867 A | * | 7/1992 | Klancher ...................... 361/62 |
| 5,784,237 A | * | 7/1998 | Velez ........................... 361/62 |
| 5,793,750 A | * | 8/1998 | Schweitzer, III et al. ... 370/242 |
| 6,018,449 A | * | 1/2000 | Nelson et al. ................. 361/66 |
| 6,222,714 B1 | * | 4/2001 | Hoffman ..................... 361/93.2 |

* cited by examiner

Primary Examiner—Adolf D. Berhane
(74) Attorney, Agent, or Firm—James V. Lapacek (57) ABSTRACT

System and equipment protection is provided for an electrical power distribution system via one or more protection arrangements for detecting and responding to faults in electrical power distribution systems. The one or more protection arrangements detect whether faults are external or internal to a distribution equipment configuration in a power system via directional sensing. The protection arrangements also detect and respond to faults in a power distribution system utilizing various combinations of primary and back-up protection arrangements that are operational simultaneously and in both closed-loop and open-loop configurations.

7 Claims, 9 Drawing Sheets

BUS FAULT SCHEME: 3-4 (2 AND 5 BY DTT)
OVERREACHING A: 2-5 (3 AND 4 BY DTT)

*Fig. 10*

PRIMARY: 4-5

OVERREACHING A: 2-5 (3 AND 4 BY DTT)
OVERREACHING B: 4-7 (5 AND 6 BY DTT)

*Fig. 11*

| Contact | Element | Channel | Description |
|---|---|---|---|
| 67F/Y | (MBT1) | A | Forward phase or ground instantaneous |
| 67F(TOC)/Y | (MBT1) | B | Forward phase or ground inverse TOC |
| 67R/Y | (MBT2) | A&B | Mirrored bits transmit reverse phase or ground instantaneous O/C |
| 67R(TOC)/Y | | | Reverse phase or ground inverse TOC |
| 67FS/Y (52b/Y) | (OUT1) | | Forward sensitive phase or ground instantaneous O/C |
| 67FS/X | (IN2) | | Forward sensitive phase or ground instantaneous O/C (relay #12) |
| 52b/X | (IN2) | | Local adjacent F/I switch status (F/I #13) |
| 85-1/LOC | (MBR1) | A | Mirrored bits receive remote forward instantaneous (relay #15)- Loss of Channel logic closes contact for 30 cycles after loss of communication |
| 85-2 | (MBR2) | A | Mirrored bits receive remote reverse instantaneous O/C (relay #15) |
| 85-3/LOC | (MBR1) | B | Mirrored bits receive forward TOC from relay #26 (Loss of Channel logic same as 85-1/LOC) |
| 85-4 | (MBR2) | B | Mirrored bits receive reverse instantaneous O/C from relay #26 |
| 85X2 | (ROKA) | A | Comm channel and remote relay healthy (relay #15)-TDDO=30 cycles (indicates comms healthy) |
| 85X4 | (ROKB) | B | Comm channel and remote relay healthy (relay #26)-TDDO=30 cycles (indicates comms healthy) |
| DTT Rem. Y | (MBT3) | A | Mirrored bits transmit trip DTT remote F/I #15 |
| DTT Rem. X | (OUT2) | | DTT remote F/I #12 via relay #13 |
| DTT F/I#26 | (MBT3) | B | Mirrored bits transmit trip DTT F/I #26 |
| 62-2/85-2 | | | Blocking signal receive timer (2 cycles) |
| 62BF/1 | | | Breaker failure protection timer #1 (10 cycles)- initiated by any trip |

TRIP Y (OUT3), TRIP X (OUT2), CLOSE Y (OUT4), OPEN Y(OUT5), 52aFI-Y (IN3),
SW-Y/OPEN (IN4), SW-Y/CLOSE (IN5), 52a/FI-W3 (IN-6), 52a/FI-W4 (IN7),
VISTA/LR (IN8), VISTA/AC (IN9), VISTA/DC (IN10), VISTA/LP (IN11)
Y Local Fault Interrupter/Relay (#14)   X Adjacent (local) Fault Interrupter/Relay #13)
(MBR#) (MBT#)   Input/Output provided by mirrored bits technology
(IN#) (OUT#)     Input/Output provided by hard wire connection
(ROKA) (ROKB)  Communication channel and remote relay monitors

METHOD FOR DETECTING FAULTS INTERNAL TO A DISTRIBUTION EQUIPMENT CONFIGURATION

This application claims the benefit of U.S. Provisional Application No. 60/215,641 filed on Jun. 30, 2000.

BACKGROUND OF THE INVENTION

1. Field of the Invention

The present invention relates generally to methods and arrangements for detecting and responding to faults in electrical power systems and more particularly to methods and arrangements that utilize directional sensing to determine whether or not a fault is internal or external to a particular circuit point.

2. Description of Related Art

Various methods and arrangements have been proposed and/or used to detect and respond to fault conditions in electrical power systems. For example, various instantaneous and time-current protective devices sense and respond to fault conditions either by directly interrupting the fault or by both interrupting and isolating the fault condition via communication/cooperation with one or more other devices. For example, see the following U.S. Pat. Nos. for examples of these types of systems: 6,018,449; 5,784,237; 5,303,112; 5,701,226; 5,341,268; 5,793,750. A specific type of fault detection is a bus differential protection arrangement that operates by summing individual phase currents and detecting a fault based on the algebraic sum exceeding a given threshold.

While the arrangements of the prior art may be useful and generally satisfactory for their intended purposes, they are not always capable of detecting and responding to fault conditions due to problems with communications or other misoperations.

SUMMARY OF THE INVENTION

Accordingly, it is a principal object of the present invention to provide arrangements and methods for detecting and responding to faults in electrical power systems to isolate the faults and provide continued desirable fault protection for the reconfigured system.

It is another object of the present invention to provide a method and arrangement to detect whether faults are external or internal to a distribution equipment configuration in a power system via directional sensing.

It is still another object of the present invention to provide a method and arrangement to detect and respond to faults in a power distribution system utilizing various combinations of primary and back-up protection arrangements that are operational simultaneously and in both closed-loop and open-loop configurations.

These and other objects of the present invention are efficiently achieved by arrangements and methods for detecting and responding to faults in electrical power distribution systems. The present invention provides methods and arrangements to detect whether faults are external or internal to a distribution equipment configuration in a power system via directional sensing. The present invention also detects and responds to faults in a power distribution system utilizing various combinations of primary and back-up protection arrangements that are operational simultaneously and in both closed-loop and open-loop configurations.

BRIEF DESCRIPTION OF THE DRAWING

The invention, both as to its organization and method of operation, together with further objects and advantages thereof, will best be understood by reference to the specification taken in conjunction with the accompanying drawing in which:

FIGS. 1A and 1B, when combined to form FIG. 1, depict a one-line block diagram, schematic and diagrammatic representation of a power distribution system utilizing the methods and arrangements of the present inventions to illustrate methods and arrangements of the present invention;

DETAILED DESCRIPTION

Figure 1A:
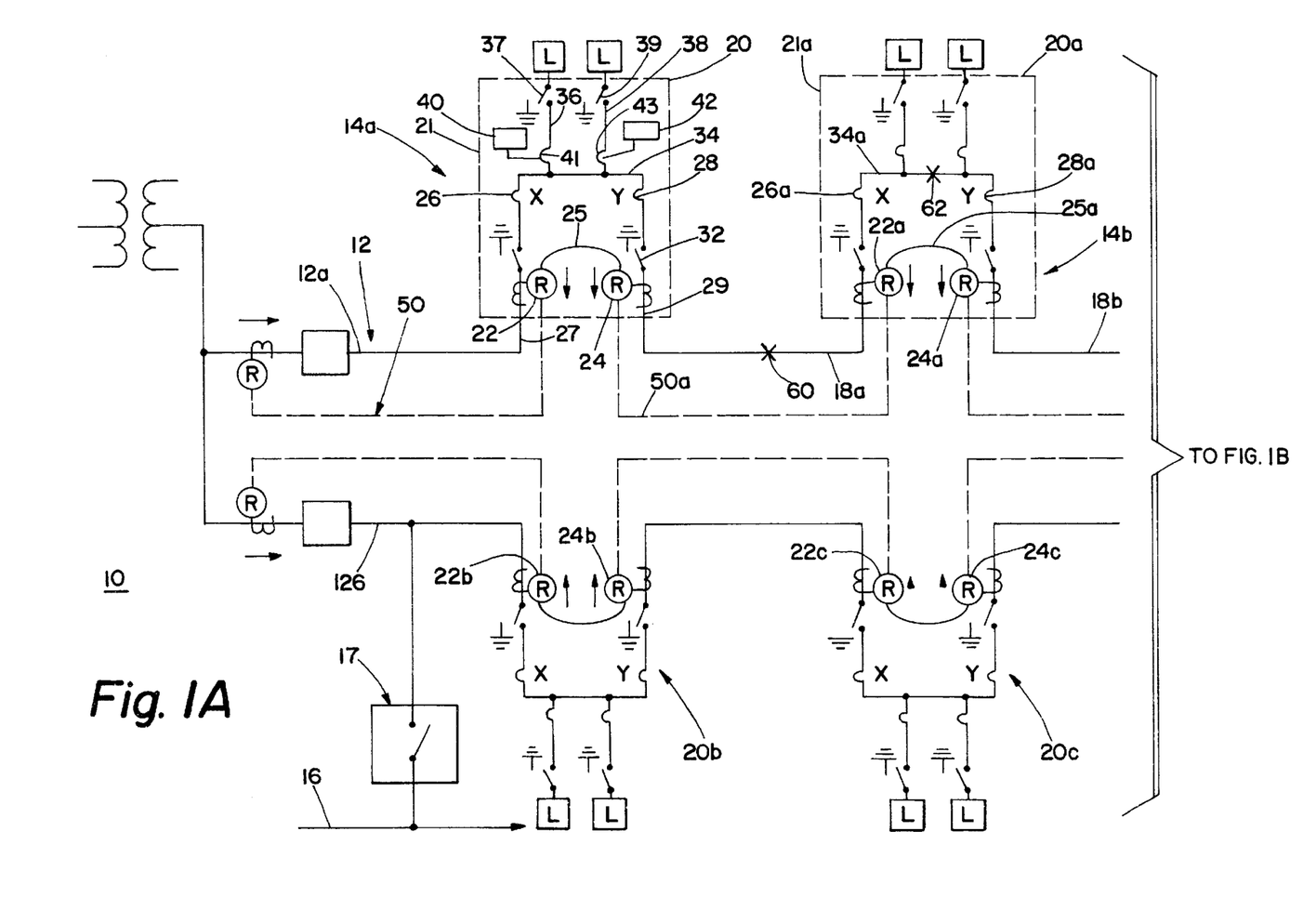
Figure 1B:
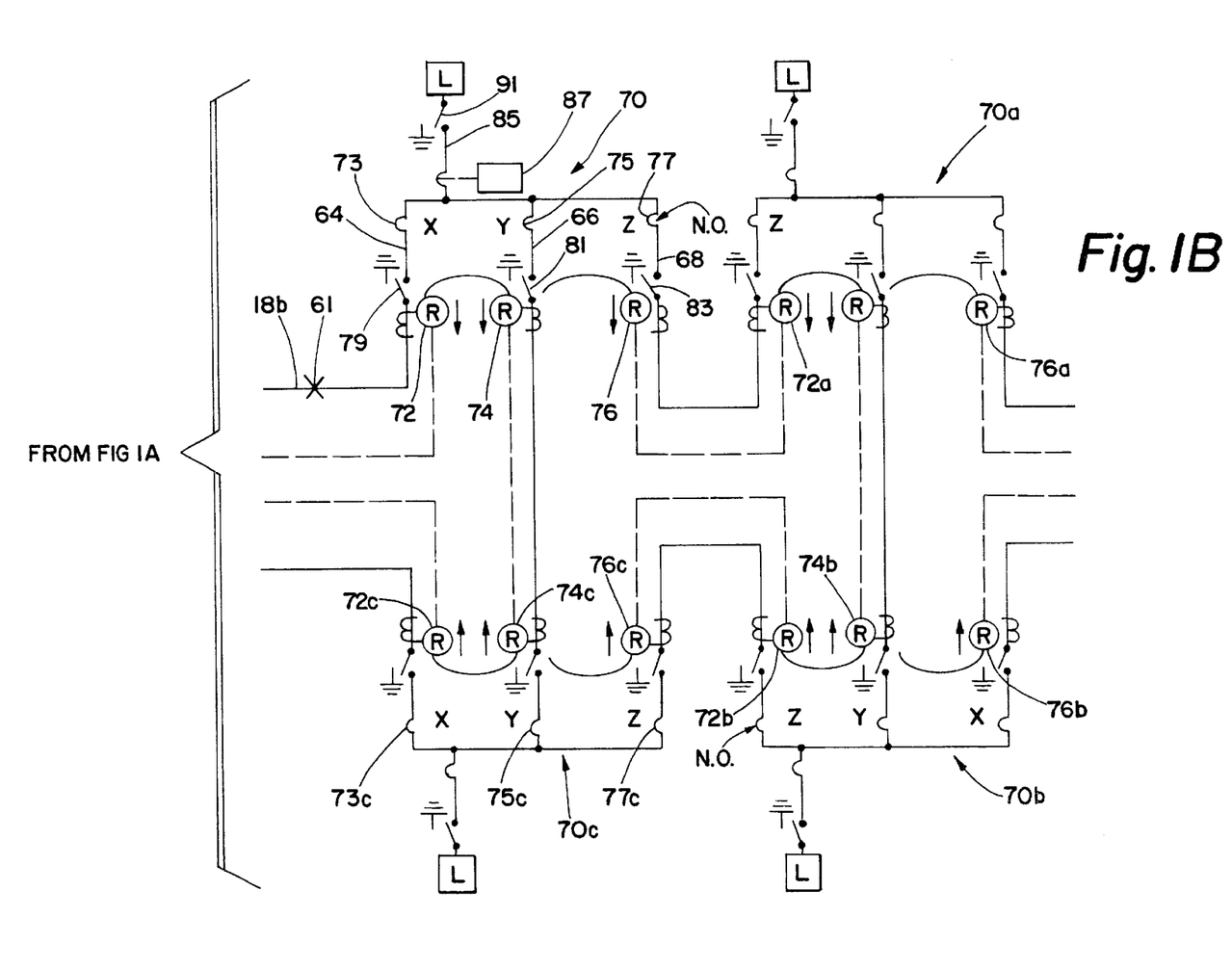

Referring now to FIG. 1, various aspects and embodiments of the fault detection and protection methods and arrangements of the present invention will be described in conjunction with the illustrative electrical power system 10. The illustrative electrical system 10 is of the type that distributes or routes electrical energy via electrical lines or cables 12a, 12b to define a feeder 12, e.g. in the form of a loop or path including two or more sectionalizing circuit points 14, e.g. 14a, 14b, distributed along the path so as to define individual spans, e.g. 18a, 18b. It should also be understood that the system 10 can function with two or more normally closed loops or feeder circuits, e.g. a second loop 16 with the two loops 12, 16 being selectively connected at 17 via automatic source transfer equipment in the event of a loss of voltage so as to feed loop 16 from loop 12. While the system 10 is illustrated in FIG. 1 as a so-called "one-line" representation, it should be understood that in accordance with common practice, this represents a multi-phase system, e.g. having three individual phases and a grounded neutral. Thus, in the following discussion of various protection arrangements, the detection is for each phase of the system and neutral. Accordingly, each protection arrangement responds to detect a fault on the basis of detection for one phase or neutral.

Power users of the system 10 are connected through the protection arrangements at the sectionalizing points, e.g.

14a, 14b. In this way, the system 10 responds to any electrical fault condition by isolating or sectionalizing the faulted point and reconfiguring to service the electrical users and their loads until such time that the system can be restored and returned to normal after alleviating the faulted condition, e.g. via disconnection, repair or removal of equipment or cable.

The illustrative electrical system 10 normally operates with the loop 12 being closed such that all the sectionalizing points are closed via switches and/or other circuit interrupting devices. The sectionalizing points 14 each include switchgear 20 incorporating various configurations of switches, circuit interrupters, relays and associated sensing, control and communication arrangements. An associated communication channel or facility is indicated at 50, e.g. communicating via fiber optics utilizing multiplexed signals in a specific embodiment. Of course, it should be understood that in other specific embodiments, pilot wire arrangements or radio communication are utilized for the communication of signals at 50. In a specific embodiment, the switchgear 20 is Vista® Underground Distribution Switchgear available from the S&C Electric Company, Chicago, Ill.

Considering an illustrative example of the switchgear 20, two relays 22, 24 are arranged to sense current in respective defined feeder ways 27, 29 in the line 12a and within the switchgear 20 via respective current sensing arrangements 23 and to control respective fault interrupters 26, 28 connected in the line 12a. In a preferred embodiment, the relays 22, 24 also include hard-wired interconnections at 25 for the communication of control signals therebetween. In a specific implementation, the relays 22, 24 are SEL-351 relays available from Schweitzer Engineering Laboratories, Pullman, Wash. The published SEL-351 Instruction Manual describes the various protective settings, functions and programming along with communication functions, techniques and programming. U.S. Pat. No. 5,793,750 also discloses communication aspects of this relay. Load-interrupter switches 30, 32 are also connected in the line 12a to provide suitable circuit control functions. The illustrative switchgear 20 also includes two branch-line ways 36, 38 connected from an internal bus 34 of the line 12a within the switchgear 20, e.g. housed within an enclosure indicated at 21. The switchgear 20 may also be characterized as a distribution equipment configuration.

Each of the branch-line ways 36, 38 includes a respective interrupter 41, 43 controlled by a respective overcurrent control 40, 42, e.g. a relay that senses current in the branch line and responds to overcurrents in either direction according to a predetermined TCC curve such that the overcurrent control provides the function of a resettable fuse. Each of the branch-line ways 36, 38 also includes a respective series-connected load-interrupter switch 37, 39. Another illustrative configuration of switchgear 70 is useful in the system 10 for providing connections to other loops of the system 10, e.g. similar to loop 16. The illustrative switchgear 70 includes a configuration of three 600 ampere feeder ways 64, 66 and 68 equipped with respective relays 72, 74 and 76 that sense current in each respective way and control respective fault interrupters 73, 75 and 77 connected in each respective way. Each of the feeder ways also includes a respective load-interrupter switch 79, 81, and 83 connected in series with each respective fault interrupter 73, 75 and 77. The switchgear 70 also includes one 200 ampere branch-line way 85 including an interrupter overcurrent control 87 similar to the overcurrent controls 40, 42 that controls an interrupter 89 connected in the way 85 along with the series connection of a load-interrupter switch 91. The fault interrupter 83 is normally open such that the loop 12 is normally closed and connected back to the source via line 12b through the switchgear 70c.

Figure 2:
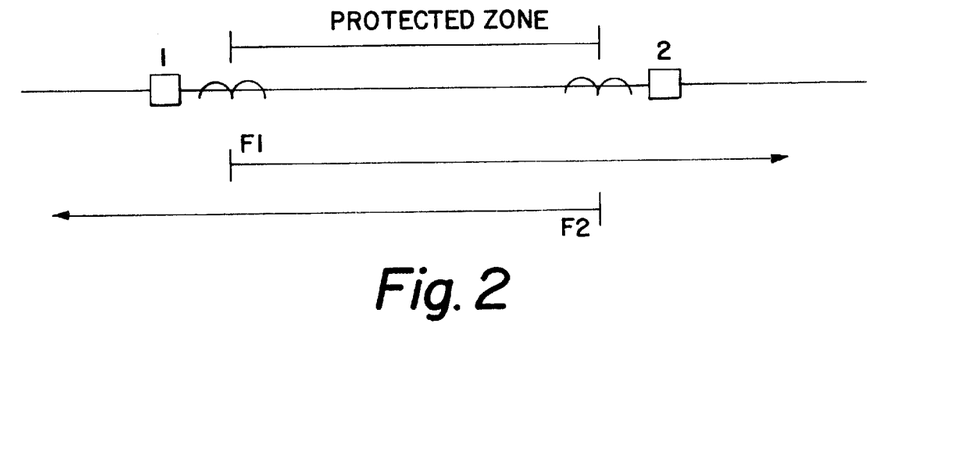
FIGS. 2–4 are simplified diagrammatic representations of a portion of the power system of FIG. 1 illustrating various conditions to illustrate a first fault protection arrangement of the present invention to detect faults.
Figure 3:
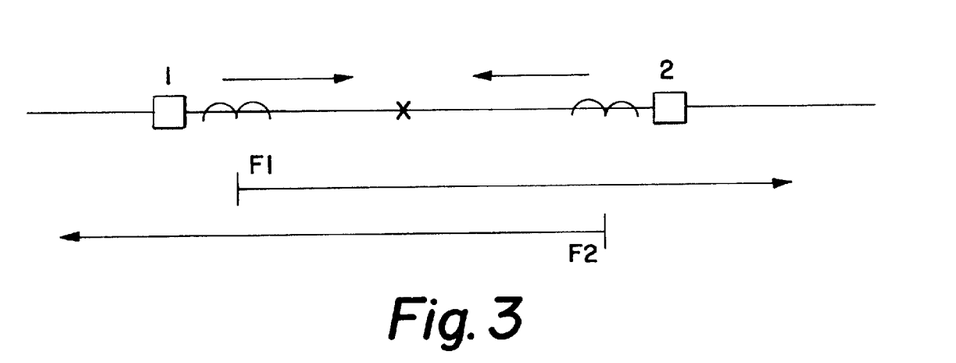
Figure 4:
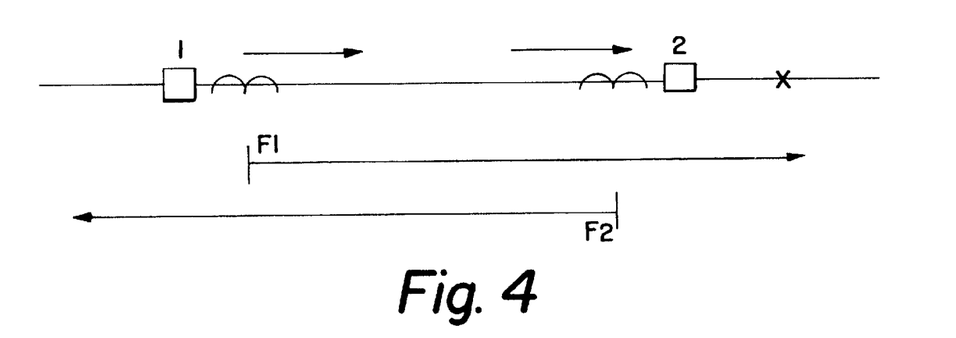

The system 10 in various embodiments includes one or more overall protection schemes known in the prior art of transmission and distribution protective schemes to detect and respond to faults or other disturbances for each individual phase and neutral. For example, in a preferred embodiment, the feeder 12 provides a first protection arrangement referred to as Permissive Overreaching Transfer Trip (POTT) in transmission relaying concepts. This first POTT protection arrangement responds to faults within predetermined defined zones and conversely does not respond to faults, which are not within the defined zones, the arrangement within each zone responding to the individual fault to appropriately isolate and sectionalize the fault. This is accomplished by requiring forward fault current from both directions such that this first protection arrangement is functional only in a closed loop system configuration. For example, and referring now to FIGS. 2–4, a simplified example is illustrated describing a protected zone between relays 1 and 2 in FIG. 2, with FIG. 3 illustrating a fault within the zone and FIG. 4 illustrating a fault outside the zone. F1 and F2 represent the forward sensing fault current functions. For a specific example in the system 10 of FIG. 1, consider that a fault is established at a point 60 along the line section 18a between the circuit points 14a and 14b. The first POTT protection arrangement utilizes the relays 24 and 22a to define a zone of protection for the line section 18a. The relay 24 sees a forward fault current and the second partner relay 22a also sees a forward fault current in the normal closed-loop configuration. Accordingly, the partner relay 22a via communication channel 50a grants permission to trip to the relay 24. In response, the relay 24 trips the fault interrupter 28 (e.g. a three-phase device) and also transmits via communications channel 50a a direct transfer trip (DTT) control to the partner relay 22a. Now the partner relay 22a trips the fault interrupter 26a such that the fault is isolated. After the system 10 has responded to isolate the fault, the loop 12 is now in an open loop condition or configuration.

Figure 5:
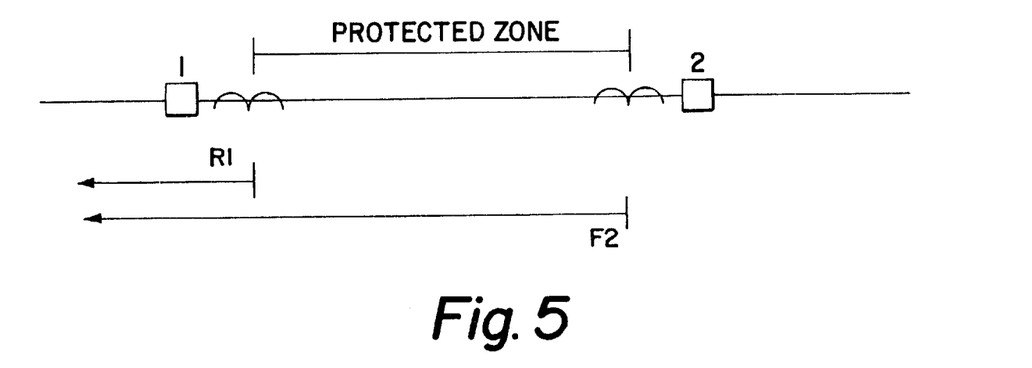
FIGS. 5–7 are simplified diagrammatic representations of a portion of the power system of FIG. 1 illustrating various conditions to illustrate a second fault protection arrangement of the present invention to detect faults.
Figure 6:
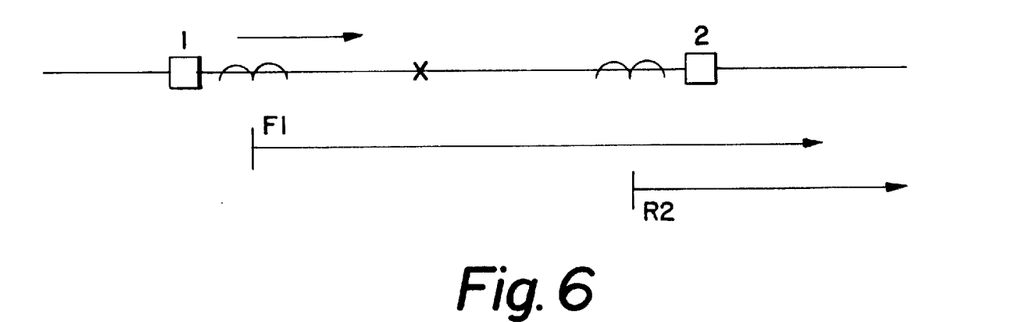
Figure 7:
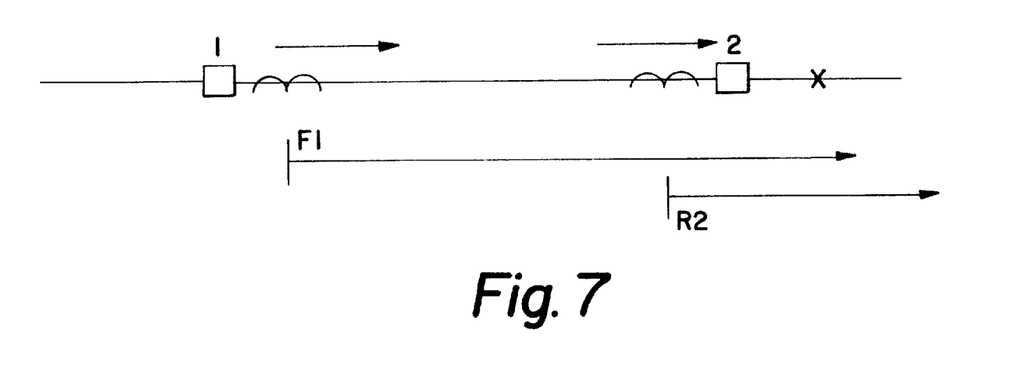

In order to provide additional protection, in a preferred embodiment, a second protection arrangement is provided referred to as Directional Comparison Blocking (DCB) in transmission relaying concepts. This second DCB protection arrangement detects faults in the reconfigured open loop configuration of the loop 12. Additionally, this second DCB protection arrangement is always operational so as to function as a "backup" or secondary type of protection to the first POTT protection arrangement in the normal closed loop configuration. For example, back up protection is desirable due to problems with the operation of the first POTT protection arrangement as might occur due to communication or equipment problems that renders the first POTT protection arrangement non-functional. This second DCB protection arrangement also functions on a defined zone basis and is operative to detect faults that are fed from one side only, e.g. operative under open-loop conditions. For example, and referring now to FIGS. 5–7, a simplified example is illustrated describing a protected zone between relays 1 and 2 in FIG. 5, with FIG. 6 illustrating a fault within the zone and FIG. 7 illustrating a fault outside the zone. F1 and F2 represent the forward sensing fault current functions of the respective relays 1 and 2 while R1 and R2 represent the reverse sensing fault current functions. For a more specific example in the system 10 of FIG. 1, for a zone of protection provided by the second DCB protection arrangement for the line section 18a via the relays 24 and 22a. Now assuming a fault at 61 in the line section 18b, the first relay 24 sees a forward fault and the second relay 22a generates a restraint or blocking signal to the relay 24 since it detects a fault outside the zone of protection of line section 18a, i.e. a reverse fault is detected by the relay 22a as current flowing to a point (e.g. 61) in a zone (e.g. line section 18b) outside the defined zone of protection, line section 18a. Thus, there is no response by the relays 24 and 22a under the second DCB protection arrangement. The response for the relays 24 and 22a to generate the blocking signal is set to be faster (to operate at a lower fault current) than the forward fault operating response, thus assuring that the blocking signal is always received in a timely manner for appropriate operation. Conversely, assuming a fault at the point 60 within the defined zone of protection of the line section 18a, the relay 24 again sees a forward fault. However, for a fault at the point 60 within the defined zone of protection, the relay 22a does not generate a blocking signal since it does not see a reverse fault and the relay 24 trips the fault interrupter 28. The relay 24 that detects the forward fault current and trips the fault interrupter 28 also sends a trip signal to the partner relay 22a which in turn trips its respective controlled fault interrupter 26a. Of course, this second DCB protection arrangement also depends on the functioning of the relays and the communication therebetween to operate. Additionally, this second DCB protection arrangement operates more slowly than the first POTT protection arrangement such that under closed-loop conditions, the first POTT protection arrangement operates first. Thus no changes to the relay settings in the loop 12 are required for operation in the reconfigured open-loop configuration.

In accordance with additional aspects of the present invention, in a preferred embodiment, the system 10 also includes a third protection arrangement utilizing directional sensing to detect and isolate bus faults within the illustrative switchgear 20 and 70, i.e. faults internal to the equipment including bus fault protection, components internal to the switchgear 20 or 70, elbow connections to feeders, elbows and bushings. This third protection arrangement is capable of detecting faults and responding thereto where there may be only one source of current at the time of the fault. In the system 10, this third protection arrangement is provided as a "backup" form of protection for the branch line protection provided via the first POTT and the second DCB protection arrangements. In the system 10 as discussed where the switchgear 20, 70 includes overcurrent control on the branch-line ways, in a preferred embodiment, coordination is also provided with the inverse characteristics of the overcurrent control, e.g. 40, such that the overcurrent control 40 is set to operate before the third bus fault protection arrangement. Assuming an internal fault occurs at 62 on the internal bus 34a of the switchgear 20a, this third bus fault protection arrangement detects the fault condition by the relay 22a detecting a reverse fault current flow (i.e. into the switchgear 20a on bus 34a) and the relay 24a not sensing a forward current flow out of the switchgear 20a. The relays 22a, 24a communicate and provide control signals via the interconnection arrangement 25a. Thus, if this condition is detected, the relay 22a trips its respective controlled fault interrupter 26a and also sends a control signal to the relay 24a via the interconnection at 25a which responds to trip its respective controlled fault interrupter 28a. Additionally, the partner relays 24 and 72 for each of the relays 22a, 24a are sent direct transfer trip signals via the communications channel 50 to trip their respective controlled fault interrupters 28 and 73. Conversely, if the relay 22a detects a reverse fault current flow when the relay 24a detects a forward fault current flow, the relay 22a does not trip and there is no response via the third fault protection arrangement since the fault is not within the detection zone for the internal faults. This can be represented in terms of relay function as the "ANDING" or series combination of function 67R for the relay 22a and function NOT67F for the relay 24a, where 67R is a reverse directional sensing inverse time delay function and 67F is a forward directional sensing inverse time delay function, the "NOT" indicating the inverse or "NOT" logic function. It should be remembered that the system 10 of FIG. 1 is illustrated by a one-line diagram. Thus, it should be understood that the third protection arrangement utilizes detection arrangements for each relay for each phase of the system and ground. While the detection of faults is described via current sensing, it should be noted that in other specific embodiments, the relays, e.g. 22a, 24a are arranged to sense impedance or other parameters indicative of faults.

Figure 8:
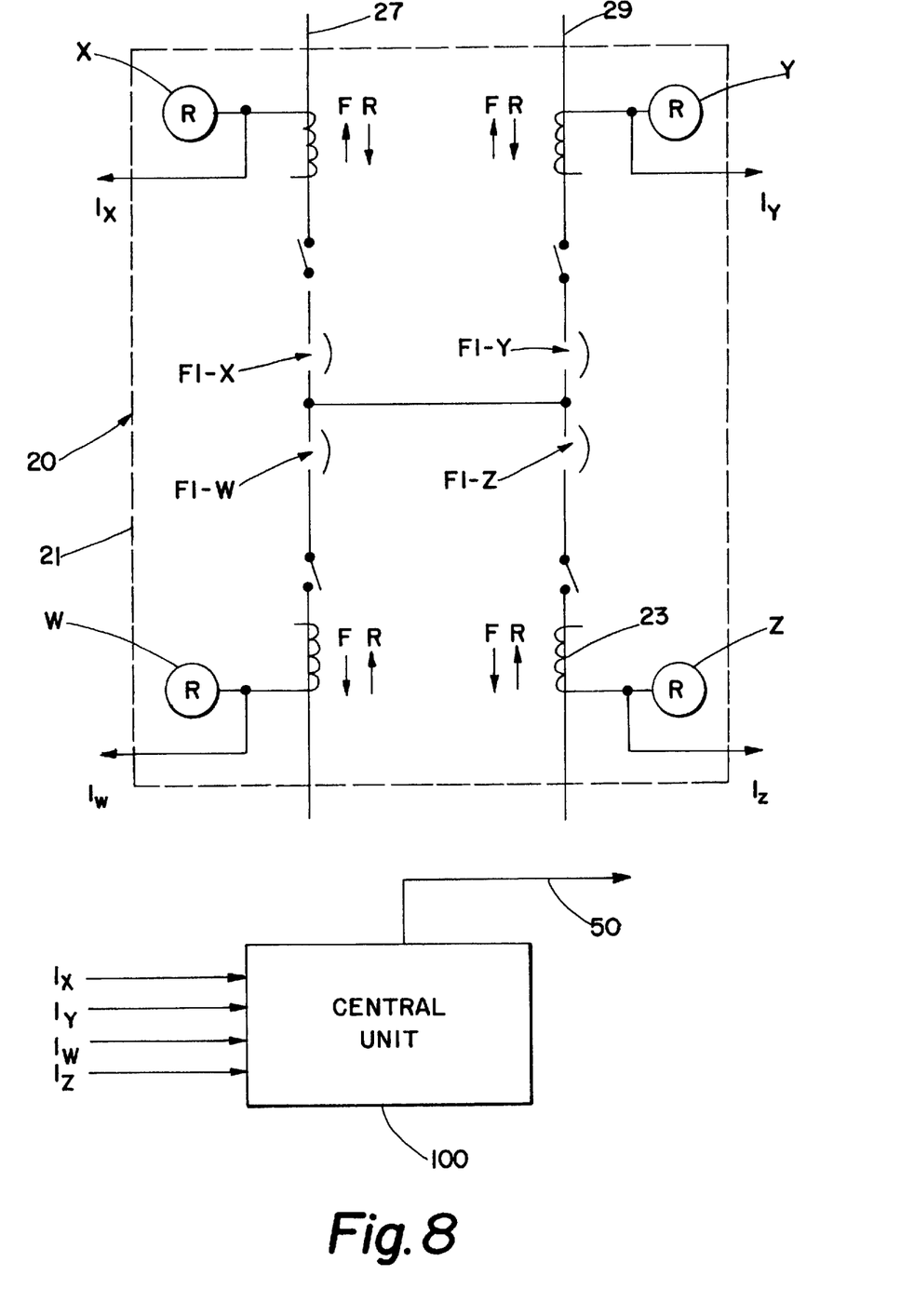
FIG. 8 is a diagrammatic representation of switchgear of the power system of FIG. 1 useful to illustrate a third fault protection arrangement of the present invention to detect faults internal to the switchgear.
Figure 9:
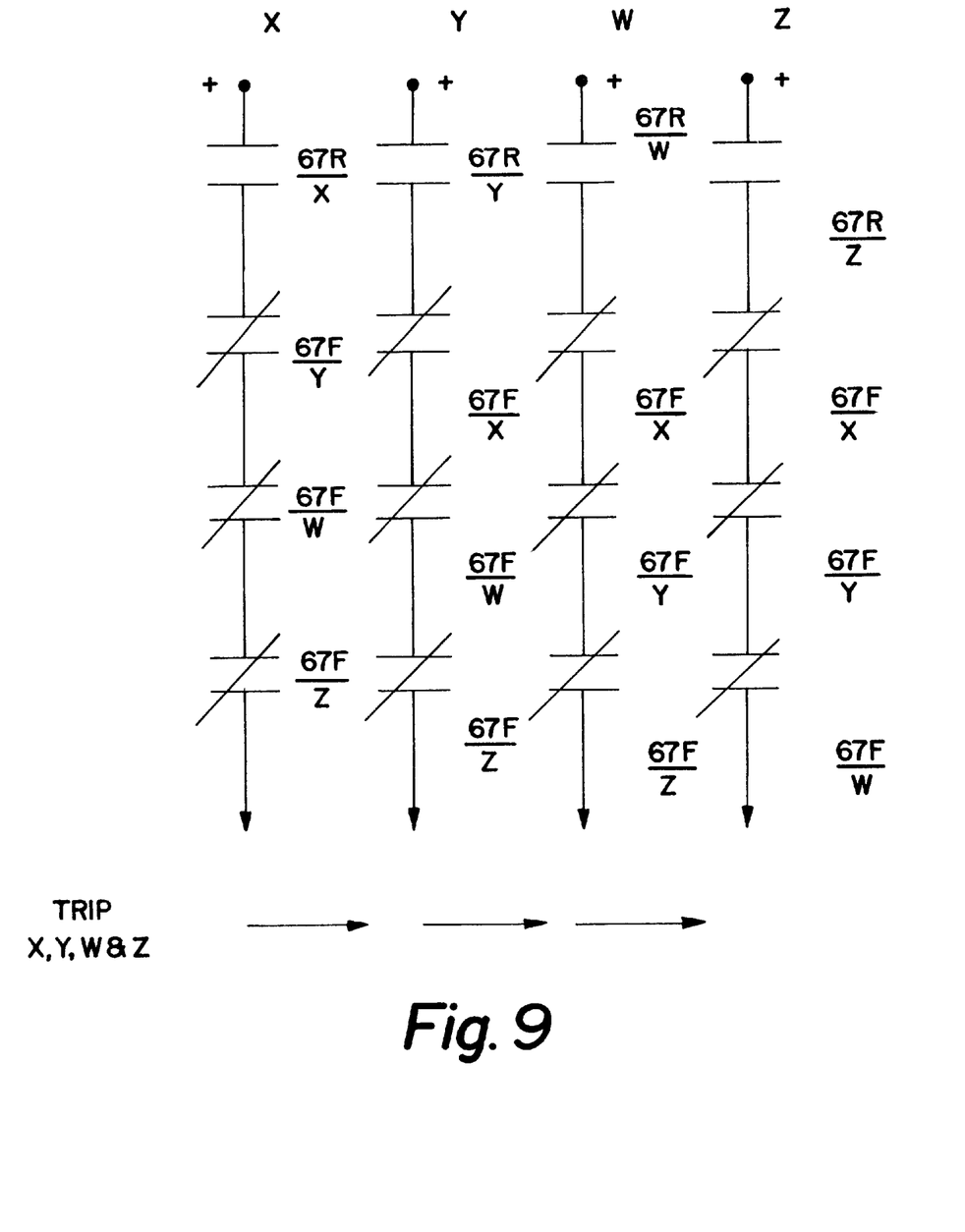
FIG. 9 is a relay logic representation useful to illustrate operation of the switchgear of FIG. 8 and the third fault protection arrangement of the present invention.

In accordance with important aspects of the present invention, while the system 10 is useful to describe how this third protection arrangement can be incorporated within a power system and other fault protection arrangements, it should be realized that in an alternate embodiment this third fault protection arrangement is provided for the switchgear 20 independent of other system protection, i.e. as a stand-alone fault detection system for internal faults of the switchgear 20 without regard to other protection arrangements or coordinating with any settings thereof. In such an alternate embodiment, relay function operation can be set as instantaneous with no intentional delay after a fault is detected without any coordination with the other fault detection arrangements or elements. Referring now additionally to FIGS. 8 and 9, FIG. 8 illustrates a simplified representation of the switchgear 20 with relays W, X Y and Z, and respective fault interrupters FI-W, FI-X, FI-Y, and FI-Z. In FIG. 9, relay contact logic diagrams illustrate the functions performed by this alternate form of the third protection arrangement with the various 67F, 67R relay functions representing respective forward and reverse directional sensing with instantaneous characteristics, the symbol of the line across the series contact representation denoting a "NOT" or inverse logic function. In this arrangement, all four relays in the switchgear 20 are utilized to define the presence of an internal fault, i.e. detection of a reverse fault current by one of the four relays and the absence of detection by any of the other three relays of a forward fault current.

Considering now another alternate embodiment of the third protection arrangement that operates similarly to that of the first embodiment and alternate embodiment of the third protection arrangement as discussed hereinabove, as shown in FIG. 8, the current sensing signals lw, lx, ly, and lz of the current sensing arrangements 23 associated with each of the relays W, X Y and Z respectively, are communicated to a central unit 100. The central unit 100 performs the directional fault current determinations as described hereinbefore to determine if a detected fault is either internal or external to the switchgear 20. If an internal fault is detected, the central unit 100 communicates with the relays X and Y via the communications channel 50 to initiate tripping of their respective fault interrupters FI-X and FI-Y.

Figure 10:
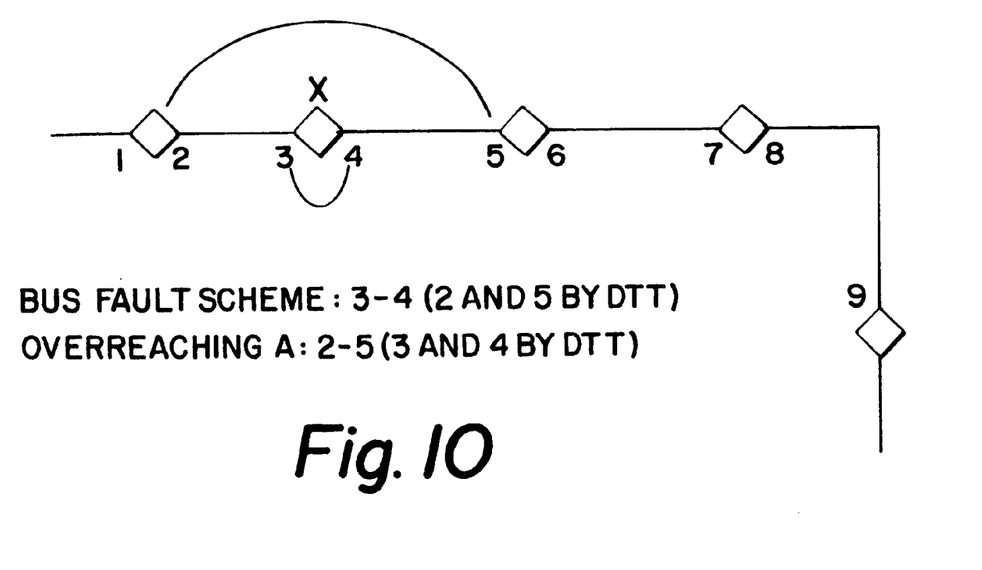
FIG. 10 is a simplified diagrammatic representation of a portion of the power system of FIG. 1 illustrating various conditions to illustrate a fourth protection arrangement of the present invention.

As an additional form of back-up protection to the previously discussed first, second and/or third protection arrangements, i.e. a fourth protection arrangement of the present invention is provided that utilizes directional sensing and overreaching concepts. Referring now additionally to FIG. 10 and a simplified system diagram, this fourth protection arrangement utilizes non-adjacent, overreaching relay pairs/partners e.g. relays 2 and 5 as illustrated in the simplified system diagram, to determine whether or not a fault exists therebetween, e.g. a fault between the relays 3 and 4. Assume that no other fault protection arrangement has responded to clear the fault between the relays 3 and 4, i.e. either the first or second fault protection arrangements or the third fault protection arrangement for internal faults between the relays 3 and 4. The relays 2 and 5 each detect a forward fault and communicate with each other establishing that a fault exists within this zone that has not been cleared such that relays 2 and 5 each operate to trip their respective fault interrupters. Further, relay 2 sends a trip signal to relay 3 and relay 5 sends a trip signal to relay 4. The arrangement can also be configured to trip when one relay sees the forward fault and the partner relay does not see a reverse fault. While this fourth protection arrangement or method does not result in the minimum isolated section of the system if another of the prior discussed protection arrangements is operative, it is useful if no other protection arrangement clears the fault. Additionally, this fourth protection arrangement is operative to respond to faults that are fed from only one source, i.e. operative in both open-loop and closed-loop configurations.

Considering now a more specific example of this fourth protection arrangement and referring now again to FIG. 1, assuming that a fault occurs either at 60 in the line section 18*a* or at 62 on the internal bus 34*a*, and assuming further that no other protection arrangement of the system 10 operates to clear the fault, e.g. via operation of relays 24, 22*a*, 24*a*, 72 or 22*a*, 24*a* in accordance with the foregoing discussion of the first, second and third protection arrangements, via the fourth protection arrangement, each of the relays 24, 72 sends signals over the communications channel 50 indicating that a forward fault current has been detected. Thus, each of the relays 24 and 72 trips their respective controlled fault interrupter 28, 73 based on each of the relays 24, 72 sensing a forward fault condition and also receiving a "permission" signal from its respective overreaching partner relay, i.e. the forward fault signal from the partner. In accordance with additional aspects of the present invention, the fourth protection arrangement in a specific embodiment is also operative to detect faults based on one of the relays 24, 72 detecting a forward fault current and no reverse fault current being sensed by its respective partner relay 72, 24. In addition to the relays 24, 72 tripping their respective controlled fault interrupters 28, 73, each of the relays 24, 72 also communicates over the communications channel 50 via a direct transfer trip relay mode (DTT) to the relays 22*a*, 24*a* respectively to trip their respective controlled fault interrupters 26*a*, 28*a*.

Figure 11:
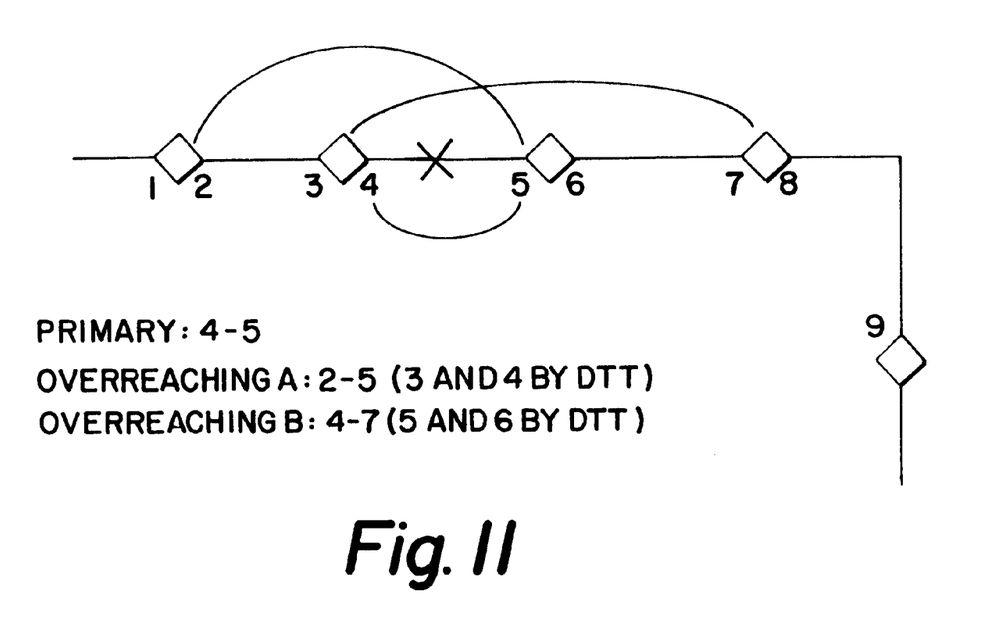
FIG. 11 is a are simplified diagrammatic representation of a portion of the power system of FIG. 1 illustrating various conditions to illustrate a fifth fault protection arrangement of the present invention.

Considering now additional aspects of the present invention, in a specific embodiment, another form of backup protection is provided for the system 10 as a fifth protection arrangement. Specifically, this fifth protection arrangement functions according to an overreaching POTT/DCB concept or relaying scheme. For example, and referring now additionally to FIG. 11, a simplified example is illustrated describing two overlapping backup zones of protection, a first zone provided between relays 2 and 5 and a second zone provided between relays 4 and 7. This form of protection functions similarly to the primary POTT/DCB combination of protection arrangements except that it includes additional time delays so as to coordinate with the primary POTT/DCB protection response and the branch line protection. Assume a fault occurs as indicated in FIG. 11 between relays 4 and 5 and that no other fault protection arrangement clears the fault including the primary protection of the first POTT or the second DCB fault protection arrangements. The relays 2 and 5 and/or the relays 4 and 7 determine that a fault exists between them. This is accomplished either by each of the relays in each pair sensing a forward fault (POTT closed loop) or by one of the relays in each pair detecting a forward fault and the respective partner relay not sending a blocking signal (DCB), i.e. the partner does not sense a reverse fault and does not send a blocking signal.

For a more specific example and referring again now to the system 10 of FIG. 1, the fifth protection arrangement defines a first zone between relays 24 and 72, and a second zone between relays 24*a* and 74*c* (switchgear 70*c*). Assuming a fault at the point 61 and assuming no other protection arrangement responds to isolate this fault, the relays 24, 72 or 24*a*, 74*c* determine that a fault exists between them (within the respective defined zone) and trip the appropriate respective controlled fault interrupters to isolate the fault. The detection of the fault within the zone is arranged to be satisfied either by both relays sensing a forward fault (POTT closed loop) or by one of the relays detecting a forward fault and the partner relay not sending a blocking signal (DCB), i.e. the partner does not sense a reverse fault and does not send a blocking signal. In an illustrative example, with a fault at the point 61 and with relays 24 and 72 sensing the fault, signals are sent to the partner relays, i.e. relay 24 sends a DTT trip signal to the relay 22*a* and the relay 72 sends a DTT trip signal to the relay 24*a*.

Figure 12:
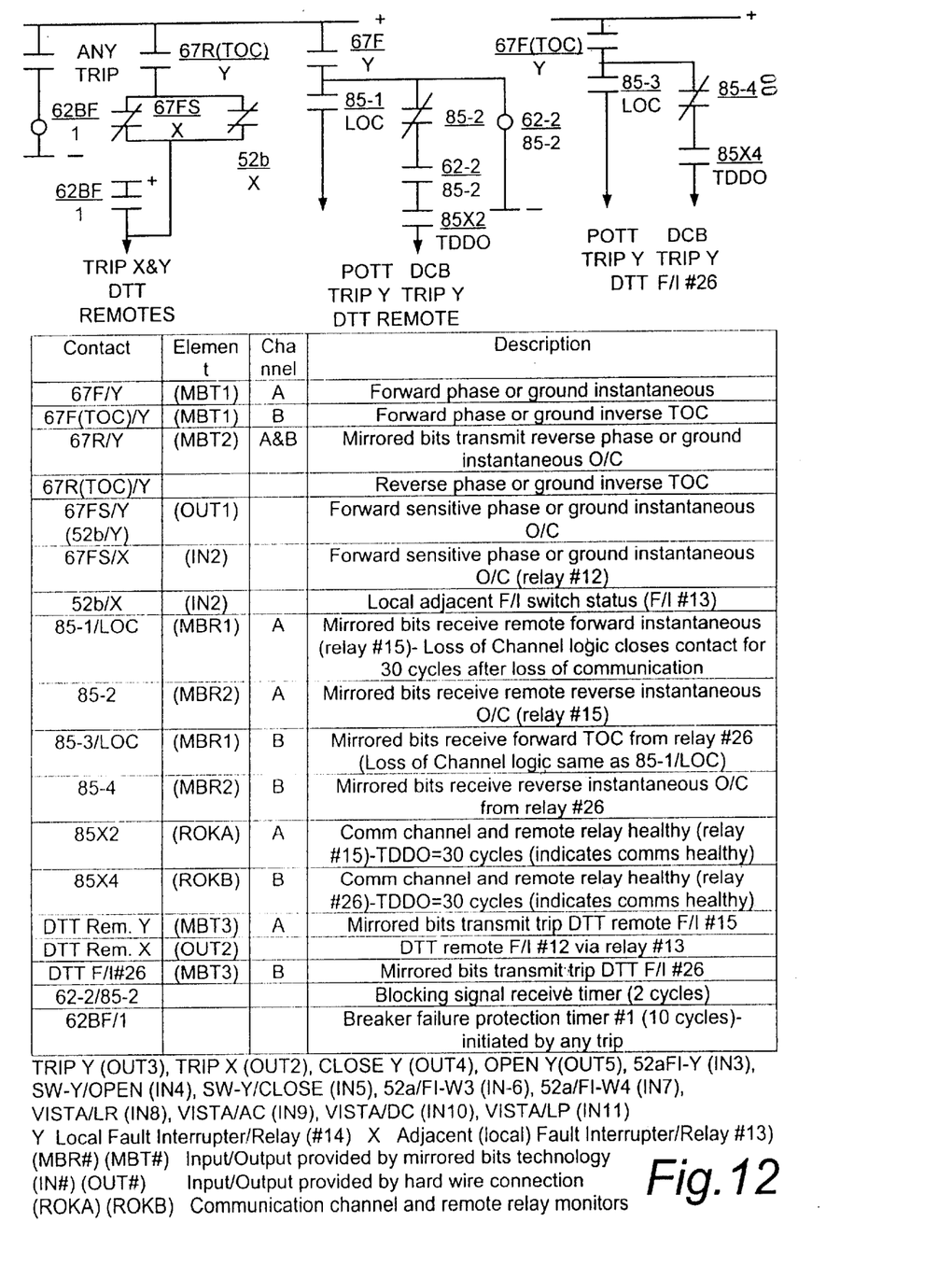
FIG. 12 is a relay logic representation to implement the first through fifth protection arrangements of the present invention for the system of FIG. 1.
Figure 13:
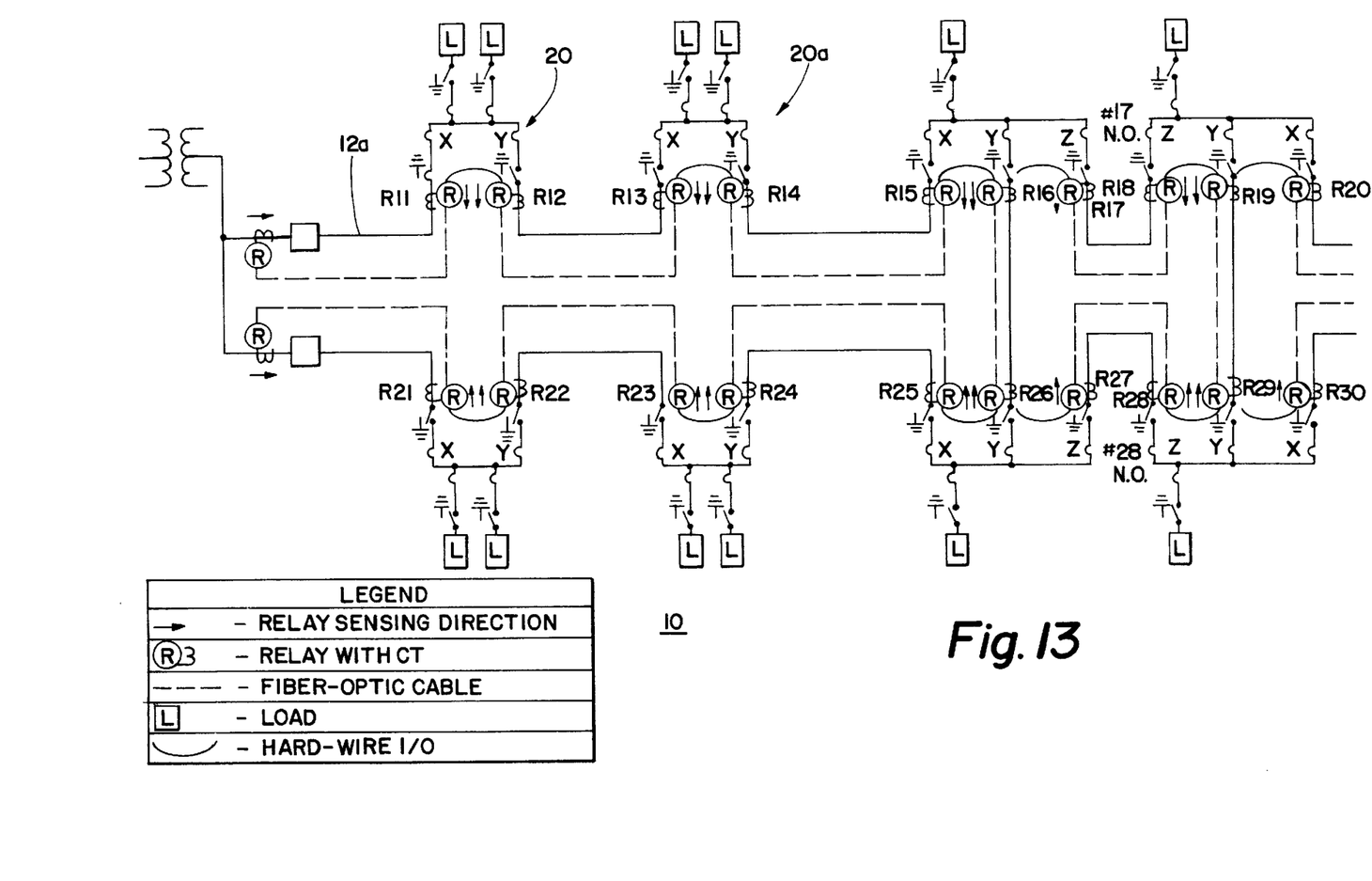
FIG. 13 is a simplified representation of portions of the power system of FIG. 1 to simplify the understanding of the relay logic representation of FIG. 12.

With reference now to FIG. 12 and 13, FIG. 12 illustrates an example of the overall relay logic for two relays referred to as relay numbers R12 and R14 in the simplified system diagram of FIG. 13 to implement the system 10 with the first through fifth fault protection arrangements as described hereinabove. The "relay#xx" designations in FIG. 12 correspond to the relays of FIG. 13 wherein they are denoted as "Rxx". The contact designations and elements listed in FIG. 12 correspond to those of the SEL-351 relay discussed hereinbefore.

While there have been illustrated and described various embodiments of the present invention, it will be apparent that various changes and modifications will occur to those skilled in the art. Accordingly, it is intended in the appended claims to cover all such changes and modifications that fall within the true spirit and scope of the present invention.

What is claimed is:

1. A method for detecting faults internal to a distribution equipment configuration connected in an electrical power system comprising sensing a fault current entering the distribution equipment configuration and not sensing the fault current leaving the distribution equipment configuration, the distribution equipment configuration including at least two feeder relays, an internal fault being detected based on a first of the feeder relays detecting a reverse fault current flow and none of the other feeder relays detecting forward fault current flow, the distribution equipment configuration further including an interrupter in series with a first of the feeder relays, the interrupter including predetermined inverse time-current characteristics, the first feeder relay including operating characteristics that coordinate with the interrupter such that the interrupter is set to operate in response to sensed fault current before the feeder relay.

2. In an electrical power distribution system having a plurality of distribution equipment configurations connected at various points of the electrical power distribution system and one or more system protection arrangements to detect faults within the system, a method for detecting and responding to faults internal to the plurality of distribution equipment configurations as a form of back-up protection to the one or more system protection arrangements, the method comprising sensing a fault current entering a distribution equipment configuration and not sensing the fault current leaving the distribution equipment configuration, the distribution equipment configuration including at least two feeder relays, an internal fault being detected based on a first of the feeder relays detecting a reverse fault current flow and none of the other feeder relays detecting forward fault current flow, the electrical power distribution system including first communication facilities for communication between the feeder relays of the distribution equipment configuration.

3. The method of claim 2 wherein the method further comprises sensing fault current at non-adjacent distribution equipment configurations to detect a fault internal to the distribution equipment configuration intermediate the non-adjacent distribution equipment configurations.

4. The method of claim 3 wherein the system further includes second communication facilities for communicating between the non-adjacent distribution equipment configurations.

5. The method of claim 4 wherein a first of the system protection arrangements is arranged to detect faults between adjacent ones of the distribution equipment configurations.

6. The method of claim 5 wherein the first of the system protection arrangements utilizes the second communication facilities for communicating between adjacent ones of the distribution equipment configurations.

7. In an electrical power distribution system having a plurality of distribution equipment configurations connected at various points of the electrical power distribution system and one or more system protection arrangements to detect faults within the system, a method for detecting and responding to faults internal to the plurality of distribution equipment configurations as a form of back-up protection to the one or more system protection arrangements, the method comprising sensing a fault current entering a distribution equipment configuration and not sensing the fault current leaving the distribution equipment configuration, each of the distribution equipment configurations including fault interrupters, the method further comprising operating the fault interrupters for a distribution equipment configuration when a fault internal to the distribution equipment configuration is detected, the electrical power distribution system including communication facilities for communicating between the adjacent distribution equipment configurations, the method further comprising operating the fault interrupters for the adjacent distribution equipment configuration via the communication facilities.

\* \* \* \* \*